United States Patent [19]

Mashimo et al.

[11] Patent Number: 4,518,376
[45] Date of Patent: May 21, 1985

[54] POWER TRANSMISSION BELT MANUFACTURE

[75] Inventors: Satoshi Mashimo, Akashi; Hazime Kakiuchi, Itami; Masayoshi Nakajima, Kobe, all of Japan

[73] Assignee: Mitsuboshi Belting Ltd., Kobe, Japan

[21] Appl. No.: 623,619

[22] Filed: Jun. 22, 1984

Related U.S. Application Data

[63] Continuation of Ser. No. 203,716, Nov. 3, 1980, abandoned.

[30] Foreign Application Priority Data

Nov. 8, 1979 [JP] Japan .................... 54-145280

[51] Int. Cl.³ .................... F16G 5/00; F16G 1/22; F16H 7/00; C08K 3/36
[52] U.S. Cl. .................... 474/261; 474/260; 524/534; 524/535; 524/552; 524/575
[58] Field of Search ............... 524/535, 534, 552, 575; 474/261

[56] References Cited

U.S. PATENT DOCUMENTS

| 3,350,345 | 10/1967 | Vanderbilt et al. | 260/41.5 |
|---|---|---|---|
| 3,957,718 | 5/1976 | Pochert et al. | 106/308 M |
| 3,992,959 | 11/1976 | Cicognani | 74/234 |
| 4,011,766 | 3/1977 | Waugh | 74/23 P |
| 4,024,773 | 5/1977 | Hartman et al. | 74/233 |
| 4,034,615 | 7/1977 | Brooks | 74/229 |
| 4,096,764 | 6/1978 | Richmond et al. | 74/233 |
| 4,127,039 | 11/1978 | Hollaway | 74/232 |
| 4,229,333 | 10/1980 | Wolff et al. | 524/571 |
| 4,255,146 | 3/1981 | Standley | 474/251 |
| 4,265,627 | 5/1981 | Inamura | 474/267 |
| 4,278,587 | 6/1981 | Wolff et al. | 524/262 |
| 4,297,145 | 10/1981 | Wolff et al. | 524/263 |
| 4,299,588 | 11/1981 | Standley | 474/264 |
| 4,357,432 | 11/1982 | Edwards | 523/351 |

FOREIGN PATENT DOCUMENTS

| 1439247 | 6/1976 | United Kingdom . |
|---|---|---|
| 1438355 | 6/1976 | United Kingdom . |
| 1524077 | 9/1978 | United Kingdom . |
| 2038341 | 7/1980 | United Kingdom . |

OTHER PUBLICATIONS

Derwent Abst. 37666/E19, (5-1982), Mitsuboshi Belting KK, (EP-50993).

Primary Examiner—Herbert J. Lilling
Attorney, Agent, or Firm—Wood, Dalton, Phillips, Mason & Rowe

[57] ABSTRACT

A power transmission belt manufacture wherein a modified rubber blend is utilized as at least one portion of the belt, with the blend including a silane coupling agent, silica and carbon black. The blend is advantageously adapted for use as the cushion rubber embedding the load-carrying cords of the belt. The invention comprehends the use of the blend further as at least one of the compression and tension sections of the belt, as desired. The modified rubber blend is advantageously utilized in power transmission belts having widely varying configurations and characteristics.

13 Claims, 7 Drawing Figures

POWER TRANSMISSION BELT MANUFACTURE

This application is a continuation of application Ser. No. 203,716, filed Nov. 3, 1980, now abandoned.

BACKGROUND OF THE INVENTION

1. Field of the Invention

This invention relates to power transmission belts and in particular to a rubber compound for use in at least one section of the belt.

2. Description of the Background Art

A number of applications of rubber compounds using silicas and silicates are known. Illustratively, silicas and silicates are utilized in rubber compounds for use as shoe soles and heels wherein the silicas provide stiffness, abrasion resistance, flex resistance, and nonmarking characteristics. Processing rolls utilized in the manufacture of steel, paper and textiles utilize rubber blends having silica therein for toughness and nonmarking characteristics. Off-road tire treads and conveyor belt covers have utilized silica blended rubber to provide cutting and chipping resistance. Skim stocks for tire and belt cords have utilized silicas for adhesion characteristics, and automotive engine mounts have used silicas in the rubber blends for heat resistance. Bumper strips and impact-absorbing devices have used silicas for stiffness, adhesion and desired coloration. Garden hose and cable jackets have utilized silica blended rubber for extrusion, abrasion resistance, and color characteristics.

In connection with the use of silica in the tire blends, increased silica content has been found to lead to a higher index of friction to provide improved stopping distance and starting traction characteristics. One disadvantage in the use of silica in tires has been the relatively high tread wear. In an attempt to reduce such wear, silane coupling agents have been utilized in the formulations.

In power transmission belts, it has been conventional to utilize rubber blends having carbon black in substantial proportion. However, such belts have not proven completely satisfactory because of relatively short life. The need for improvement in durability and reliability of power transmission belts utilizing rubber blends as a component of one or more sections thereof has been manifest. A number of problems have arisen in the use of the conventional carbon black blend rubber belts. Illustratively, cracking has occurred in the adhesion surfaces between the load-carrying cords and the embedding rubber layer known as the cushion layer. This problem has been particularly vexatious relative to the adhesion surfaces adjacent the lower part of the load-carrying cords.

Another problem has arisen in the prior art belts in the cracking in the border layers between the cushion rubber layer embedding the load cords, and the compression rubber layer inwardly thereof.

The problem has been aggravated where the belts have been utilized in environments where the temperature of the belt rises 40 to 90 degrees Centigrade as a result of the heat generated in the running operation.

While the use of ISAF and SAF carbon black have, to some extent, improved the reinforcement of the belt rubber, such reinforcement has not proven fully satisfactory. The need for not only improved cushion rubber strength, but also increased adhesiveness relative to the load-carrying cords and the adjacent belt section materials, has been manifest and continuing. No one heretofore has found a fully satisfactory solution to this vexatious problem.

SUMMARY OF THE INVENTION

The present invention comprehends the provision of a modified rubber blend for use as the embedding material of the load-carrying section of a power transmission belt wherein the blend comprises about 100 parts by weight rubber, about 0.1 to 5.0 phr (per hundred parts rubber) of silane coupling agent, about 10 to 60 phr silica, and about 2 to 60 phr carbon black.

The invention comprehends the use of the modified rubber blend additionally or alternatively as one or both of the compression section and tension section portions of the belt.

The use of the modified rubber blend has unexpectedly been found to provide substantially improved durability and life of power transmission belts avoiding the problems of the prior art discussed above.

BRIEF DESCRIPTION OF THE DRAWING

Other features and advantages of the invention will be apparent from the following description taken in connection with the accompanying drawing wherein.

DESCRIPTION OF THE PREFERRED EMBODIMENT

Figure 1:
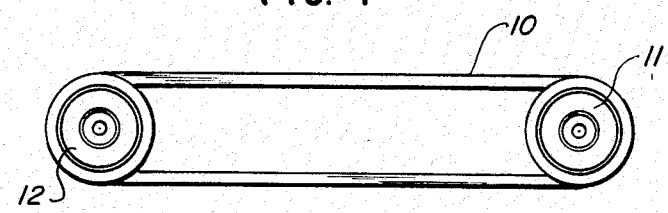
FIG. 1 is a side elevation of a power transmission system having a belt utilizing a modified rubber blend embodying the invention.
Figure 3:
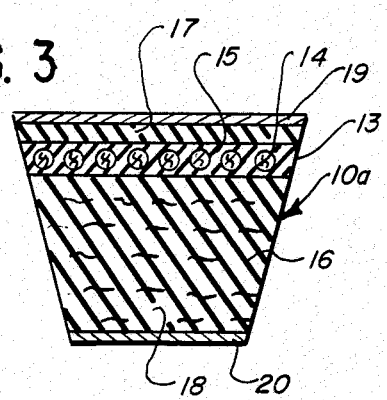
FIG. 3 is a transverse section of one form of belt utilizing the modified rubber blend of the invention.
Figure 4:
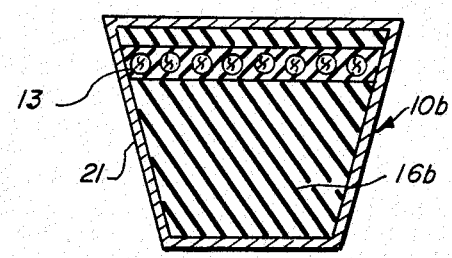
FIG. 4 is a transverse section illustrating another form of belt utilizing the invention.

The present invention is concerned with power transmission belts, such as belt 10, adapted to transmit power between a driver pulley 11 and a driven pulley 12 as a result of the belt being trained about the pulleys. Belt 10 may be in the form of any of a wide range of different belts, such as those illustrated in sectional views, FIGS. 3–7. Illustratively, referring to the V-belt 10a of FIG. 3, the belt includes a load-carrying section 13 defined by a plurality of load carrying cords 14 which extend longitudinally of the belt, i.e. in the direction about the pulleys 11 and 12, as seen in FIG. 1. The cords are embedded in a body of rubber 15 which is conventionally referred to as the cushion layer. The cushion layer is disposed outwardly of the inner compression section 16 of the belt and inwardly of the outer tension section 17 of the belt. In the embodiment of FIG. 3, belt 10a is provided with a plurality of distributed short fibers 18 extending transversely across the compression section. As will be obvious to those skilled in the art, the fibers may be utilized in the tension section additionally or alternatively. Belt 10a is further provided with a covering fabric 19 on the tenion section 17 and a cover fabric 20 on the bottom of the compression section 16, leaving the sides of the V-belt uncovered so as to define a raw edge belt. Belt 10b illustrated in FIG. 4 is similar to belt 10a except that the fabric 21 is caused to extend about the entire belt so as to define a wrapped belt. FIG. 4 illustrates the use of a compression section 16b omitting the reinforcing fibers 18 therefrom. Belt 10b utilizes a load-carrying section 13 similar to that of belt 10a.

Figure 2:
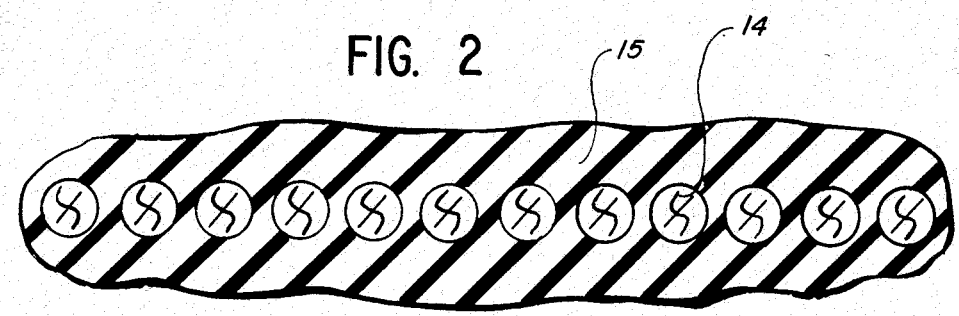
FIG. 2 is a fragmentary enlarged transverse section of the load-carrying portion of the belt.

More specifically, as shown in FIG. 2, the load-carrying cords 14 are embedded in spaced relationship to each other within the cushion rubber 15. As is well known in the art, the cords may be wound in helical fashion lengthwise of the belts in providing the desired distribution thereof, as illustrated in FIG. 2. The present invention is concerned with the use of an improved modified rubber blend as the cushion rubber 15 so as to have improved association with the load-carrying cords 14 as well as with the adjacent compression and tension sections of the belt.

More specifically, the present invention comprehends the provision of the rubber 15 as a modified rubber blend preferably including about 100 parts by weight rubber, about 0.1 to 5.1 phr of silane coupling agent, about 10 to 60 phr silica, and about 2 to 60 phr carbon black.

The invention comprehends a preferable formulation of the rubber blend as one wherein the rubber is about 100 parts by weight, the silane agent is about 0.3 to 2.0 phr, the silica is about 20 to 45 phr, and the carbon black is about 10 to 40 phr.

It has been found desirable to maintain the silane coupling agent at at least about 0.1 phr to provide the desired reinforcing effect. Further, it has been found that it is desirable to maintain the silane coupling agent at no greater than about 5.0 phr to maintain the reasonable scorch time particularly in the case of such a belt formulated of chloroprene rubber.

It has further been found desirable to maintain the silica phr as at least about 10 phr so as to provide the desired adhesive and tear strength characteristics. It has been found desirable to maintain the silica phr no greater than about 60 phr so as to limit the viscosity characteristics of the blend.

The term "rubber" as used herein includes any of the conventionally known rubbers, including natural rubber, chloroprene rubber, styrene butadiene rubber, etc.

The term "silane coupling agent" as employed herein includes Vinyl-Tris (β-Methoxy Ethoxy) Silane, γ-Glysidoxypropyltrimethoxy Silane, N-β-(Aminoethyl)γ-Aminopropyltrimethoxy Silane, γ-Mercaptopropyltrimethoxy Silane, Bis-(3-[Triethoxisilyl]Propyl-) Tetrasulfane, etc. The Bis-(3-[Triethoxisilyl]Propyl-) Tetrasulfane or γ-Mercaptopyltrimethoxy Silane coupling agents have been found to be particularly advantageously adapted for use in the cushion rubber blend.

The invention comprehends the use of a titanium coupling agent in lieu of the silane coupling agent.

As is well known to those skilled in the art, the rubber blends utilized in such power transmission belts may further include additives, such as softeners, antioxidents, processing agents, tackifiers, accelerators, and sulphurs. Illustratively, these additives may comprise stearic acidmagnesium oxide, zinc oxide, and 2-mercapto imidazoline. The blends may be produced by conventional mixing procedures, such as using Calender rolls, Banbury mixers, etc. In specific examples, the blends were mixed in a Banbury mixer and vulcanized under conventional vulcanizing conditions of approximately 150° C. for 20 minutes.

EXAMPLE I 100 phr chloroprene rubber was blended with 2 phr stearic acid, 4 phr magnesium oxide, 2 phr antioxidant, 5 phr process oil, 10 phr HAF carbon black, 40 phr silica, 1 phr γ-mercaptopropyltrimethoxy silane, 5 phr zinc oxide, and 0.3 phr 2-mercapto imidazoline.

The physical properties of the vulcanized blend were as follows:

| | |
|---|---|
| Hardness (JIS-A) | 74 at 25° C. |
| 25% Modulus (kg/cm$^2$) | 14.8 at 25° C. |
| 50% Modulus (kg/cm$^2$) | 19.2 at 25° C. |
| Tensile Strength (kg/cm$^2$) | 202 at 25° C. |
| Elongation (%) | 520 at 25° C. |
| Tear Strength (JIS-A) | 80 at 25° C. |
| Hardness (JIS-A) | 73 at 90° C. |
| 25% Modulus (kg/cm$^2$) | 14.4 (−3) at 90° C. |
| 50% Modulus (kg/cm$^2$) | 19.0 (−1) at 90° C. |
| Tear Strength (JIS-A) | 51.0 (−36) at 90° C. |

Note:
Numerals in parentheses indicate Rate of Change

Adhesion of the blend to the load-carrying cords and to the adjacent compression and tension sections was found to be excellent. The cord utilized in the belt construction was a polyester cord which was RFL-treated and having a characteristic of 1100D/2×3. The adhesive characteristic as measured by the force required to tear the cord out of the cushion rubber was as follows:

Adhesive Force (kg/cm) at 25° C.: 29.5
Adhesive Force (kg/cm) at 90° C.: 20.1

The adhesive force of conventional load-carrying section utilizing carbon black has been normally less than approximately 10 kg/cm at 90° C., such low tear strength being a substantial contributing factor to early failure of the prior art belts. The prior art belts further had a relatively low adhesive force of approximately 17.3 kg/cm at 25° C. so that the improved blend formulation may be seen to provide improved characteristics at room temperatures as well as at elevated temperatures as occur in the belt during operation.

EXAMPLE II

A similar blend having a slightly modified formulation is prepared as follows:

100 phr chloroprene rubber was blended with 2 phr stearic acid, 4 phr magnesium oxide, 2 phr antioxidant, 5 phr process oil, 25 phr HAF carbon black, 30 phr silica, 0.7 γ-mercaptopropyltrimethoxy silane, 5 phr zinc oxide, and 0.3 phr 2-mercapto imidazoline.

The physical characteristics of this improved blend are as follows:

| | |
|---|---|
| Hardness (JIS-A) | 76 at 25° C. |
| 25% Modulus (kg/cm$^2$) | 17.0 at 25° C. |
| 50% Modulus (kg/cm$^2$) | 21.9 at 25° C. |
| Tensile Strength (kg/cm$^2$) | 199 at 25° C. |
| Elongation (%) | 455 at 25° C. |
| Tear Strength (JIS-A) | 65 at 25° C. |
| Hardness (JIS-A) | 75 at 90° C. |
| 25% Modulus (kg/cm$^2$) | 16.3 (−3) at 90° C. |
| 50% Modulus (kg/cm$^2$) | 21.5 (−2) at 90° C. |
| Tear Strength (JIS-A) | 43 (−34) at 90° C. |

Note:
Numerals in parentheses indicate Rate of Change

The adhesive force characteristics of this blend are as follows:

Adhesive Force (kg/cm) at 25° C.: 27.2

Adhesive Force (kg/cm) at 90° C.: 17.7

The two example blends described above were utilized in a raw edge V-belt, such as V-belt 10a of FIG. 3, having a total strength of 1015 mm and having a height of 9.0 mm and maximum width of 12.5 mm. These belts were trained over suitable pulleys 11 and 12 and run with the following results:

|  | Reference Example (Carbon Black Only) | Example I | Example II |
| --- | --- | --- | --- |
| Time duration until cracking appears (Hrs) | 48 | 230 | 248 |
| Time duration until belt-life is over (Hrs) | 256 | 1120 | 1298 |

The pulley size was 60 mm diameter and the running speed waas 3600 rpm under a load of 50 kg. The substantial improvement in crack resistance and belt life over the prior art belt utilizing carbon black only shows a dramatic and totally unexpected improvement. Not only does the invention provide substantially improved belt life, but further tends to show further improved results at running temperatures.

Figure 5:
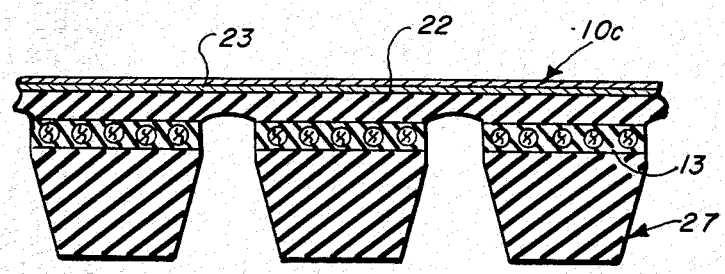
FIG 5 is a fragmentary transverse section of a banded belt having V-elements utilizing the invention.

Referring to FIG. 5, a banded belt 10c is shown to comprise a belt utilizing the improved blend as the cushion rubber portion 13 in each of a plurality of V-elements 27 maintained in side-by-side relationship by a band 22. As shown, the band may be provided with a covering fabric 23.

Figure 6:
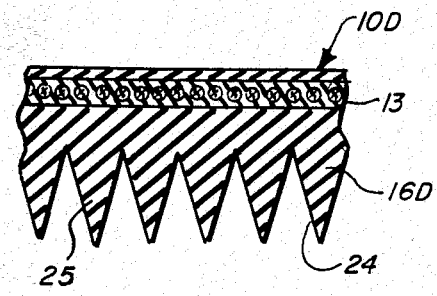
FIG. 6 is a transverse section of another form of belt utilizing the invention.

Another form of belt is illustrated in FIG. 6 to comprise a belt 10d wherein the compression section 16d is provided with a plurality of V-shaped grooves 24 to define a plurality of side-by-side triangular ribs 25 as the innermost portion of the compression section.

Figure 7:
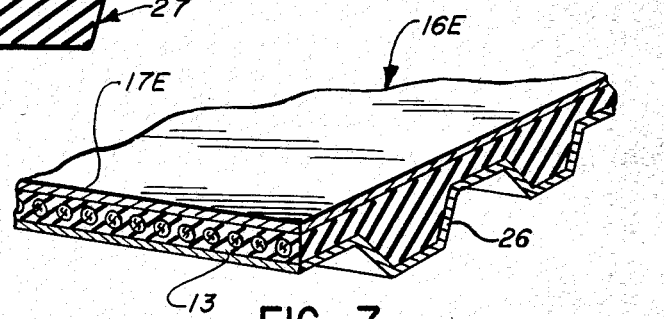
FIG. 7 is a fragmentary perspective section of still another form of belt utilizing the invention.

Still another form of belt generally designated 16e is illustrated in FIG. 7 to comprise a belt having a plurality of transversely extending grooves 26 inwardly of the cushion section 13. The different belt configurations illustrated in FIGS. 3–7 are exemplary only, it being understood that any suitable belt configuration, both raw edge and wrapped, etc. may be utilized with the invention. Further more specifically, the invention comprehends that the improved modified rubber blend be utilized alternatively or additionally as the tension and compression section material, as desired.

Thus, while the invention is advantageously adapted in providing high T-peel test characteristics providing improved bonding of the cushion rubber to the load-carrying cords and to the adjacent tension and compression sections, the additional characteristics of the modified rubber blend haave been found unexpectedly to also be advantageously adapted for use as the tension and compression sections themselves.

The invention provides an improved modified rubber blend for use in power transmission belts which maintains a high strength and adhesion characteristic at elevated belt-running temperatures providing extended belt life and durability. The increase in these parameters is unexpectedly great and the blend of the present invention provides a novel and simple solution to the vexatious problem of cracking and short useful life of the prior art power transmission belt utilizing carbon black in the absence of the silica and silane coupling ingredient.

Having described our invention as related to the embodiments set out herein, it is our intention that the invention be not limited by any of the details of the description, unless otherwise specified, but rather, be constructed broadly within its spirit and scope as set out in the appended claims.

We claim:

1. In a belt having a load-carrying section provided with load-carrying cords, an improved cushion having a high strength bond with said cords embedded therein, said cushion being formed of a modified rubber blend, comprising:
   (a) about 100 parts by weight chloroprene rubber,
   (b) about 0.1 to 5.0 phr of silane coupling agent,
   (c) about 10–60 phr silica,
   (d) about 0.3 phr sulphur containing cross-linking agent, and
   (e) about 2–60 phr carbon black.

2. In a belt having a compression section, a load-carrying cushion having load-carrying cords embedded therein, and a tension section, said cushions being formed of modified rubber blend comprising:
   (a) about 100 parts by weight styrene-butadiene rubber
   (b) about 0.1 to 5.0 phr of silane coupling agent,
   (c) about 10–60 phr silica,
   (d) elemental sulphur cross-linking agent, and
   (e) about 2–60 phr carbon black.

3. The belt structures of claim 1 wherein said cross-linking agent is 2-mercaptoimidazoline.

4. The belt structures of claims 1 or 2 wherein said silane coupling agent is Vinyl-Tris (β-Methoxy Ethoxy)Silane, γ-Glysidoxypropyltrimethoxy Silane, N-β-(Aminoethyl)γ-Aminopropyltrimethoxy Silane, γ-Mercaptopropyltrimethoxy Silane, or Bis-(3-[Triethoxisilyl]-Propyl-)Tetrasulfane.

5. The belt structures of claims 1 or 2 wherein the phr of said silane coupling agent is in the range of about 0.3 to 2.0 phr.

6. The belt structures of claims 1 or 2 wherein the phr of said silica is in the range of about 20–45 phr.

7. The belt structures of claims 1 or 2 wherein the phr of said carbon black is in the range of about 10–40 phr.

8. The belt structures of claims 1 or 2 wherein said belt is a V-belt.

9. The belt structures of claims 1 or 2 wherein said belt is a raw edge belt.

10. The belt structures of claims 1 or 2 wherein said belt is a wrapped belt.

11. The belt structures of claims 1 or 2 wherein said belt defines a compression section having a plurality of grooves extending transversely to the longitudinal extent of the belt.

12. The belt structures of claims 1 or 2 wherein said belt includes at least one section provided with distributed transversely extending short reinforcing fibers.

13. The belt structures of claims 1 or 2 wherein said belt is a banded belt having a plurality of belt elements defined at least in part by said blend.

* * * * *